(12) United States Patent
Owens (10) Patent No.: US 7,697,927 B1
(45) Date of Patent: Apr. 13, 2010

(54) MULTI-CAMPUS MOBILE MANAGEMENT SYSTEM FOR WIRELESSLY CONTROLLING SYSTEMS OF A FACILITY

(75) Inventor: Steve B. Owens, Kansas City, MO (US)

(73) Assignee: Embarq Holdings Company, LLC, Overland Park, KS (US)

( * ) Notice: Subject to any disclaimer, the term of this patent is extended or adjusted under 35 U.S.C. 154(b) by 771 days.

(21) Appl. No.: 11/042,263

(22) Filed: Jan. 25, 2005

(51) Int. Cl.
*H04M 3/00* (2006.01)
*H04M 1/00* (2006.01)

(52) U.S. Cl. .................................. 455/420; 455/550.1

(58) Field of Classification Search ................ 455/420, 455/550.1, 566, 41.1, 41.2; 725/105
See application file for complete search history.

(56) References Cited

U.S. PATENT DOCUMENTS

| | | |
|---|---|---|
| 3,703,714 A | 11/1972 | Andrews |
| 3,997,718 A | 12/1976 | Ricketts et al. |
| 4,303,937 A | 12/1981 | Cook |
| 4,375,637 A | 3/1983 | Desjardins |
| 4,866,515 A | 9/1989 | Tagawa et al. |
| 4,872,195 A | 10/1989 | Leonard |
| 5,027,211 A | 6/1991 | Robertson |
| 5,061,916 A | 10/1991 | French et al. |
| 5,086,385 A | 2/1992 | Launey |
| 5,109,222 A | 4/1992 | Welty |
| 5,310,349 A | 5/1994 | Daniels et al. |
| 5,550,863 A | 8/1996 | Yurt et al. |
| 5,565,908 A | 10/1996 | Ahmad |
| 5,601,432 A | 2/1997 | Bergman |
| 5,621,456 A | 4/1997 | Florin et al. |
| 5,684,952 A | 11/1997 | Stein |
| 6,020,881 A | 2/2000 | Naughton et al. |

(Continued)

FOREIGN PATENT DOCUMENTS

EP    1 445 917    *    8/2004

(Continued)

OTHER PUBLICATIONS

TrueCom; Building communications systems communications controllers 5120 series; copyright 1998 Simplex time recorder.*

(Continued)

*Primary Examiner*—George Eng
*Assistant Examiner*—Michael Faragalla
(74) *Attorney, Agent, or Firm*—Sonnenschein Nath & Rosenthal LLP (57) ABSTRACT

Disclosed is a handheld wireless device which works in cooperation with a facility system. The system includes a first network device. This first network device includes a webserver and a database on a network. A second network device is also included in the network. This second device includes a microcontroller. The microcontroller is adapted to receive commands from an application running on the webserver, and cause a switch device to control a facility public-address system in response to said first command. The system also includes an I/O controller. This I/O controller receives commands from the microcontroller to control the facilities hardware systems. With respect to hardware systems, the device may interact with the facilities HVAC system, lighting systems, door and locker locks, etc. With respect to the facilities communications systems, the device is able to interface with the buildings alarms, public-address systems, and bell systems.

24 Claims, 3 Drawing Sheets

U.S. PATENT DOCUMENTS

| | | | |
|---|---|---|---|
| 6,038,425 | A | 3/2000 | Jeffrey |
| 6,060,994 | A | 5/2000 | Chen |
| 6,072,395 | A | 6/2000 | Vega |
| 6,185,773 | B1 | 2/2001 | Goedde |
| 6,192,282 | B1 | 2/2001 | Smith et al. |
| 6,233,428 | B1 | 5/2001 | Fryer |
| 6,370,323 | B1 | 4/2002 | Adolph et al. |
| 6,374,079 | B1 | 4/2002 | Hsu |
| 6,501,502 | B1 | 12/2002 | Chen |
| 6,661,340 | B1 | 12/2003 | Saylor et al. |
| 6,748,597 | B1 | 6/2004 | Frisco et al. |
| 6,775,518 | B2 | 8/2004 | Norcott et al. |
| 6,813,777 | B1 | 11/2004 | Weinberger et al. |
| 6,844,807 | B2 | 1/2005 | Inoue et al. |
| 6,879,243 | B1 | 4/2005 | Booth et al. |
| 7,035,390 | B2 * | 4/2006 | Elliott .................. 379/201.02 |
| 7,123,142 | B2 | 10/2006 | Bohbot et al. |
| 2002/0038461 | A1 | 3/2002 | White et al. |
| 2002/0112121 | A1 | 8/2002 | Gerszberg et al. |
| 2002/0170064 | A1 * | 11/2002 | Monroe et al. .............. 725/105 |
| 2003/0009668 | A1 | 1/2003 | Chan et al. |
| 2003/0105854 | A1 | 6/2003 | Thorsteinsson et al. |
| 2003/0191802 | A1 | 10/2003 | Zhao et al. |
| 2003/0200009 | A1 | 10/2003 | Von Kannewurff et al. |
| 2003/0204856 | A1 | 10/2003 | Buxton |
| 2003/0208762 | A1 | 11/2003 | Hanai et al. |
| 2004/0003051 | A1 | 1/2004 | Krzyanowski et al. |
| 2004/9993051 | | 1/2004 | Kryzanowski |
| 2004/0039757 | A1 | 2/2004 | McClure |
| 2004/0117647 | A1 | 6/2004 | Ballard |
| 2004/0148632 | A1 | 7/2004 | Park et al. |
| 2004/0172658 | A1 | 9/2004 | Rakib et al. |
| 2004/0194148 | A1 | 9/2004 | Schultz et al. |
| 2004/0210944 | A1 | 10/2004 | Brassil et al. |
| 2004/0253945 | A1 | 12/2004 | Janik .......................... 455/419 |
| 2005/0003338 | A1 | 1/2005 | Norcott ...................... 434/350 |
| 2005/0028208 | A1 | 2/2005 | Ellis et al. |
| 2005/0078934 | A1 | 4/2005 | Fish et al. |
| 2005/0080818 | A1 | 4/2005 | Kindberg et al. |
| 2005/0125083 | A1 * | 6/2005 | Kiko ........................... 700/19 |
| 2005/0131957 | A1 | 6/2005 | Watkinson |
| 2005/0193098 | A1 * | 9/2005 | Khandpur et al. ........... 709/220 |
| 2005/0206513 | A1 * | 9/2005 | Fallon ........................ 340/506 |
| 2005/0215244 | A1 * | 9/2005 | Whitson ..................... 455/420 |
| 2006/0020993 | A1 | 1/2006 | Hannum et al. |
| 2006/0069736 | A1 | 3/2006 | Czeisler et al. |

FOREIGN PATENT DOCUMENTS

JP         2002002486      *  1/2002

OTHER PUBLICATIONS

TrueCom Building Communications Systems Communications Controllers 5120 Series, May 1998, Publication S5120-0012-7, pp. 1-6.
Advancements Bring Windows-based Software, Ethernet Network Compatibility to 5120 Intercom Systems, Feb. 2001, pp. 1-2.
Non-Final Office Action dated Mar. 23, 2007 for U.S. Appl. No. 10/236,286.
Response filed Jul. 23, 2007 to Non-Final Office Action dated Mar. 23, 2007 for U.S. Appl. No. 10/236,286.
Final Office Action dated Oct. 16, 2007 for U.S. Appl. No. 10/236,286.
Response filed Oct. 26, 2007 to Final Office Action dated Oct. 16, 2007 for U.S. Appl. No. 10/236,286.
Advisory Action dated Nov. 19, 2007 for U.S. Appl. No. 10/236,286.
Non-Final Office Action dated Feb. 13, 2008 for U.S. Appl. No. 10/236,286.
Response filed May 13, 2008 to Non-Final Office Action dated Feb. 13, 2008 for U.S. Appl. No. 10/236,286.
Final Office Action dated Sep. 10, 2008 for U.S. Appl. No. 10/236,286.
Non-Final Office Action dated Dec. 11, 2007 for U.S. Appl. No. 10/803,046.
Response filed Mar. 11, 2008 to Non-Final Office Action dated Dec. 11, 2007 for U.S. Appl. No. 10/803,046.
Final Office Action dated Jun. 3, 2008 for U.S. Appl. No. 10/803,046.
Response filed Sep. 3, 2008 to Final Office Action dated Jun. 3, 2008 for U.S. Appl. No. 10/803,046.
Non-Final Office Action dated Nov. 16, 2006 for U.S. Appl. No. 10/928,568.
Response filed Feb. 16, 2007 to Non-Final Office Action dated Nov. 16, 2006 for U.S. Appl. No. 10/928,568.
Final Office Action dated May 21, 2007 for U.S. Appl. No. 10/928,568.
Response filed Jul. 20, 2007 to Final Office Action dated May 21, 2007 for U.S. Appl. No. 10/928,568.
Non-Final Office Action dated Oct. 10, 2007 for U.S. Appl. No. 10/928,568.
Response filed Jan. 8, 2007 to Non-Final Office Action dated Oct. 10, 2007 for U.S. Appl. No. 10/928,568.
Final Office Action dated Apr. 28, 2008 for U.S. Appl. No. 10/928,568.
RCE and Response filed Jun. 30, 2008 to Final Office Action dated Apr. 28, 2008 for U.S. Appl. No. 10/928,568.
Non-Final Office Action dated Aug. 1, 2008 for U.S. Appl. No. 11/074,861.
Response filed Nov. 3, 2008 to Non-Final Office Action dated Aug. 1, 2008 for U.S. Appl. No. 11/074,861.
Non-Final Office Action date mailed Jan. 21, 2009 for U.S. Appl. No. 10/694,337.
Non-Final Office Action date mailed Dec. 11, 2008 for U.S. Appl. No. 10/803,046.
Non-Final Office Action date mailed Nov. 10, 2008 for U.S. Appl. No. 10/951,740.
Response filed Feb. 10, 2009 to Non-Final Office Action date mailed Nov. 10, 2008 for U.S. Appl. No. 10/951,740.
Advisory Action date mailed Jul. 28, 2008 for U.S. Appl. No. 10/928,568.
RCE/Response filed Oct. 28, 2008 to Final Office Action date mailed Apr. 28, 2008 for U.S. Appl. No. 10/928,568.
Non-Final Office Action date mailed Jan. 9, 2009 for U.S. Appl. No. 10/928,568.
Final Office Action date mailed Jan. 7, 2009 for U.S. Appl. No. 11/074,861.
Sprint TekNet IP for Higher Education press release, Jul. 18, 2003.
Sprint TekNet IP Overview press release, Jul. 18, 2003.
System Integrates All School Tech Functions press release, Jul. 18, 2003.
Sprint TekNet IP Integrated Communications System, Installation Overview, Jul. 19, 2002.
Sprint TekNet IP Installation Manual, Oct. 2001.
IC-Net Systems—FF Coax Network, ICC-Smart TV Controllers, Feb. 17, 2004.

* cited by examiner

MULTI-CAMPUS MOBILE MANAGEMENT SYSTEM FOR WIRELESSLY CONTROLLING SYSTEMS OF A FACILITY

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention related generally to the field of managing facility systems. More specifically, the present invention is directed to remotely controlling the mechanical, electrical, AV, communications, and other systems in schools.

2. Description of the Related Art

Facilities, e.g., schools, include numerous systems which may be manually or computer-controlled. The typical modern school may be equipped with advanced computer-control systems. These systems are capable of controlling numerous facility systems.

One example of computer-controlled systems are the school's facility systems, e.g., HVAC, lighting, automatically-opened doors, and door locks. It is known to control all these systems using a PC or other components associated with the school's local area network (LAN).

These schools also typically include communications systems which have, in recent years, become increasingly elaborate. For years they have been equipped with bells, phone, public address, and email systems. Video equipment has also been used.

These conventional manual and automated school facility control arrangements are somewhat effective. They do, however, have their limitations. For example, an administrator may be out of the office, but may wish to change a bell schedule or sound an emergency alarm. Because a wayward administrator does not have access to their PC, or the school's LAN, situations may arise which make it difficult for the administrator to adequately access the school's systems.

After-hour situations may also point to a need for increased system accessibility. For example, a teacher may forget to bring home his or her lesson plan which is in the early stages of preparation. This might require the principle to return to the school after hours to unlock the schools doors for the forgetful teacher.

Therefore, there is a need in the art for a system and method for remotely accessing the systems of a facility in order to make these systems more accessible for convenience and safety.

SUMMARY OF THE INVENTION

The present invention provides a device and method which accomplish the above objectives. This is done by providing a handheld wireless device which works in cooperation with a facility system. The system includes a first network device. This first network device includes a webserver and a database on a network—normally located in the facility. A second network device is also included in the network. This second device includes a microcontroller. The microcontroller is adapted to receive commands from an application running on the webserver, and cause a switch device to control a facility public-address system in response to said first command. The system also includes an I/O controller which receives commands from the microcontroller to control the facilities hardware systems.

With respect to hardware systems, the device may interact with the facilities HVAC system, lighting systems, door and locker locks, etc.

With respect to the facilities communications systems, the device is able to interface with the buildings alarms, public-address systems, and bell systems.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a system and method for using a handheld wireless device to control a facilities electrical, mechanical, and communications systems remotely. The handheld device is essentially used as a remote control for the facility system.

The term "facility," as used in this specification is to be interpreted in its broadest sense. The term is not meant to require the presence of a building, or any particular kind of establishment. Rather, it is simply meant to be a location at which at least one system exists. Preferably, a plurality of systems.

In one embodiment, the wireless device is a java-enabled phone. In one embodiment it operates using a Java 2 Platform Micro Edition (J2ME) application. Alternatively, the device could be a wireless personal digital assistant or a laptop computer which is wireless enabled, or using a different platform arrangement.

The wireless device interfaces with the school's systems. The device is located within the coverage area of a CDMA network. This enables the device to control hardware at the facility remotely. The hardware which might be controlled includes locks, lights, HVAC systems, and other like systems in the facility.

The communications systems of the facility are also controllable using the device. This may involve remotely accessing the public address system of the facility. The schools bells may also be controlled as well as the facility's video distribution systems. This enables the user to play video content for classrooms.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a hardware arrangement including a wireless device and facility hardware systems. These facility systems may include at least one computing device which may or may not be a part of a LAN. The systems may also include surveillance, hardware controls, communications, as well as other systems. In terms of software, the wireless device as well as the facility system may each include a computer-program product that includes computer-useable instructions embodied on one or more computer-readable media.

Computer-readable media include both volatile and non-volatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
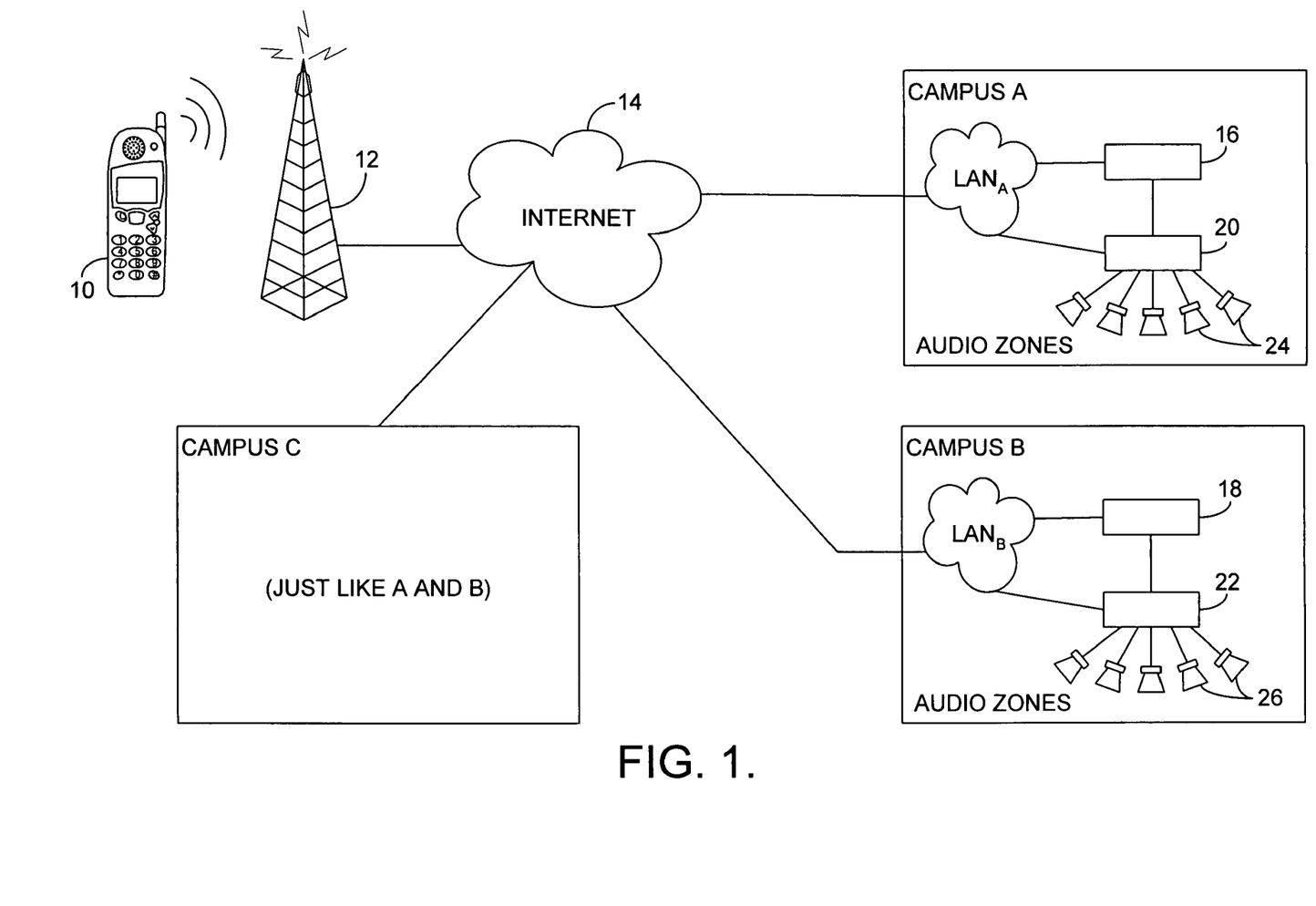
FIG. 1 is a high level schematic showing the wirelessly-controlled multi-campus system of the present invention.
Figure 2:
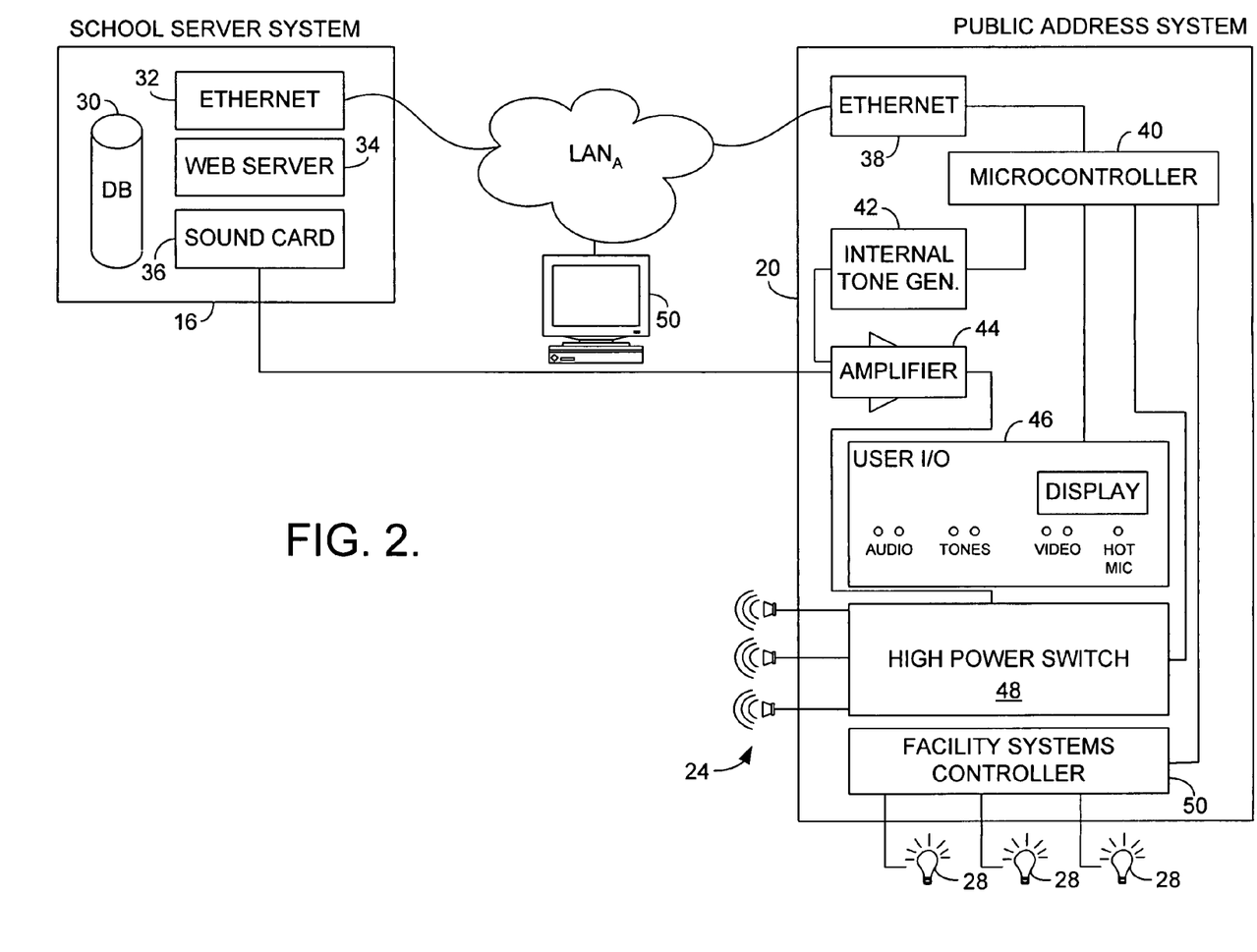
FIG. 2 shows the school's support systems for the system of the present invention.
Figure 3:
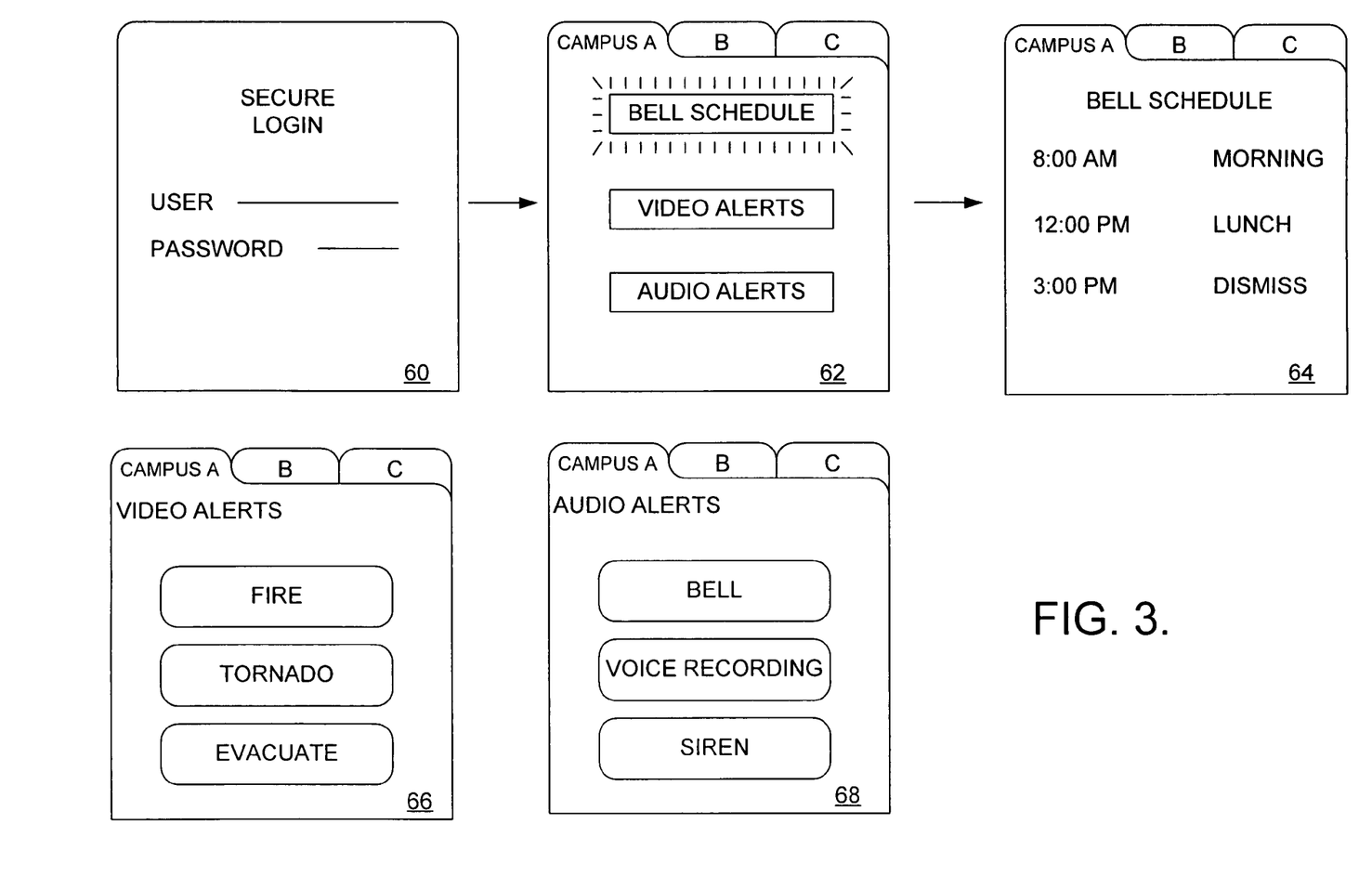
FIG. 3 shows a series of screen shots which are presented to the user on the wireless device in order to control the school's systems.

Embodiments of the present invention are disclosed in FIGS. 1-3. FIG. 1 is a high level schematic showing the wirelessly-controlled multi-campus system of the present invention. The system comprises a wireless device 10 which is included in a wireless network 12 and controls the a plurality of systems in a plurality of schools, which are identified as Campus A, Campus B, and Campus C in the figure. Even though the facilities in FIG. 1 are disclosed as being schools, one skilled in the art will recognize that the system of the present invention could be used in other kinds of buildings, businesses, or other facilities. The term "facility" as used in this patent application and its claims is not to be given some more restricted meaning implying a particular kind of structure, building or residence. Rather, the objectives of the present invention would work with a facility that did not include any traditional structure or building. The term as used here should be interpreted as an entity or location having electrical systems, lights, HVAC systems, public address systems, or other systems which require control.

Wireless device 10 may also embody numerous devices. It may be any form of wireless device. Device 10 could be any java-enabled phone, wireless personal digital assistant (PDA), or a wireless enabled laptop computer. In the preferred embodiment, device 10 is able to run J2ME applications. It could instead comprise one of numerous other devices which are wireless enabled.

Wireless device 10 also does not have to be included within a CDMA wireless network like network 12. It could instead be practiced using other kinds of wireless networks, such as Wi-Fi or infrared communications systems. Other possibilities exist. The use of the term "wireless" should not be construed as delineating any particular wireless system. The term is to be given its most broad interpretation. Essentially meaning substantially not physically wired.

Wireless device 10 supports a computer application (in the preferred embodiment a J2ME application) which is used to remotely control systems in a number of schools. The application running on device 10 does this over an internet 14 as shown in FIG. 1. This could also, however, occur over an intranet arrangement.

Interfacing with the facility will occur with an application running on a server in each of the schools. For campus A, this server is identified as a server 16. For campus B, the server is identified as a server 18. It should be understood that a similar arrangement would exist in campus C, though the specifics are not shown.

Each of the servers, e.g., servers 16 and 18 in the preferred embodiment are web servers (or some other kind of application server which are included in the LAN of the particular school). A local area network, $LAN_A$ in campus A is included in the internet via an interface 119, e.g., an Ethernet connection. Campus B also has a local area network, $LAN_B$, which is also included in the internet. In this embodiment, facilities A and B are schools. They could, however, be any kind of building, facility or other locale and work equally well with the methods and systems of the present invention.

Each of the campuses includes a manager, e.g., managers 16 and 18. These managers are network devices. Examples of the kinds of devices capable of serving as one of the managers are disclosed in commonly-owned and copending U.S. patent application Ser. Nos. 10/236,286 and 10/694,337. Each manager includes computing and electronic components arranged in a manner known to one skilled in the art.

A more detailed view of manager 20 which is representative of all the managers in the system may be seen in FIG. 2. Referring to the figure, it may be seen that manager 20 comprises numerous internal components.

One component is an interfacing component 38. In this embodiment, component 38 is an Ethernet connection into $LAN_A$. One skilled in the art will know how an Ethernet connection works and may be set up.

Another component of manager 20 is a microcontroller 40. Microcontroller 40 is similar to those used in other types of networking devices. Because it is linked to $LAN_A$ via component 38, it is able to receive commands from server 16 that have been directed by wireless device 10. It then takes these commands and directs high powered switch 48 to control audio zones, and facility system controller 50 in a manner which will be described in more detail hereinafter.

Another component of manager 20 is an internal tone generator 42. Tone generator 42, at the direction of microcontroller 40, is able to generate a variety of sounds (analog audio) which will be amplified by an amplifier 44 and played in various audio zones 24 in the school.

Amplifier 44 also receives and amplifies audio from a soundcard in server 16. Soundcard 36 converts digital files (WAV files in the preferred embodiment) in database 30 into an analog signal which is then transmitted either directly or over $LAN_A$. This audio would likely be recorded announcements or other digital audio content.

In addition to being controllable by wireless device 10 using server 16, commands may be administered to microcontroller 40 manually. This may be done using a push-button I/O user interface 46 which in the preferred embodiment is simply a face panel on the front of the network device 20. It has I/O pushbutton "tone" switches which, when depressed will cause microcontroller 40 to active selected tones which can be played in different zones, e.g., zones 24. Different options, e.g., which tones are played, and where, may be selected by navigating through options presented on a display shown on the face of the device. Audio content from WAV files on server 16 may also be selected and played in various zones by navigating options displayed on the display using the "audio" buttons shown. The "video" buttons shown may be used to play JPEG files from server 16 to video players in zones in the school through the schools cable network. Interface 46 also comprises a "hot mic" which, as the name suggests, enables the user to make live announcements to various zones in the school from close proximity to the manager 20.

Manager 20 also comprises a high power switch component which receives commands from microcontroller 40. These commands may be received from the school server system 16, or from the user I/O interface 46 and will play audio content over a plurality of audio speakers or other audio devices 24 in a variety of zones in the school. Switch 48 is a simple I/O device which one skilled in the art will recognize can be controlled using a microcontroller like microcontroller 40.

The communication systems in campuses A-C might include alarms, bells, instructional video playing devices (such as VCR/DVD systems, video-on-demand systems), email messaging systems, and phone systems possibly including elaborate voice mail arrangements. All of these could be controlled by switch 48 which is managed by microcontroller which takes its orders from school server system 16, which is controlled by wireless device 10. Thus, all of the above-mentioned communications systems may all be remotely controlled.

Another component of manager 20 is a facility systems controller 50 which is another I/O device that exerts power controls for the system. For example, component 50 takes commands from microcontroller to control the lighting system of the facility. A lighting system 28 is shown in FIG. 2 as being managed by device 20. Because of the FIG. 1, arrangement, this is all enabled remotely. Though lighting system 28 is represented in the figure as three lights, in reality the typical school comprises many more lights in many different locations (rooms). In FIG. 2, however, the embodiment has been extremely simplified for simplicity's sake. Thus, the lights in different rooms and in different areas inside and outside the school are able to be individually turned on and off by remote control using the system.

Facility systems controller 50 could also be used to control other hardware systems in campuses A-C. These systems might include HVAC systems, door locks, locker locks, as well as other systems all of which can be remotely controlled by the wireless device 10.

The school server systems 16 and 18 support applications which are running on application/web network server 34. These software applications may replace the former control software arrangements for all of the separate systems in the school. The application (or applications) on the server, e.g., webserver 34 is able to be interfaced with through the internet 14 and CDMA network 12 using the wireless device 10.

Wireless device 10 also includes a software application or a plurality of software applications. This software arrangement enables the interfacing between device 10, and thus, each of the systems, e.g., hardware, communications, in each of the campuses. The generation of this type of application with the aforementioned capabilities, and the specific programming languages and techniques used to do so, will be within the knowledge of one skilled in the art.

Using the arrangement disclosed in FIGS. 1 and 2, a high-level administrator is able to interface with a plurality of schools from the same handheld device. Though only three campuses (A-C) are shown in the FIG. 1 arrangement, it is important to note that this arrangement has been greatly simplified. It is within the scope of the present invention that any number could be present and still fall within the scope of the present invention. Even hundreds of schools could be included within the arrangement of the present invention. Only three have been shown here, however, in order to simplify matters.

Moving on now to the representation in FIG. 3, we see an elaborate series of computer screen shots. These screen shots are generated by the J2ME application running on the wireless device 10. One skilled in the art will know how to create an application having GUI which presents screen shots like those disclosed which include options menus which are displayed on a display on wireless device 10. The menus are shown in a likely order in which they might be presented.

A first screen 60 shown in FIG. 3 is a log in screen. Most likely the user will have to navigate through other option menus to get to screen 60. A school administrator user would likely desire to remotely access the facilities systems after receiving information from or about the school. The administrator might receive a phone call or email on the same wireless device 10. For example, a call might inform the administrator that a light was left on in the school accidentally by the janitorial staff. In such a case, the administrator would click on an icon (not shown on the device to bring up the J2ME application. Screen 60 would then come up. The user would then enter a user ID and password in a secure manner which will be well known to those skilled in the art.

In the background, this is accomplished as follows. Referring back to FIGS. 1 and 2, the user, once the icon is clicked and screen 60 is raised, the device 10 is able to interface with the process running on web browser 16. Via username and password, the user is able to access the application. By doing so, access to the application is securely obtained. By accessing the server through the wireless device, the user is able to control the PA and facility systems.

Menu screen 62 is displayed to the user after log in. This screen includes three options—"bell schedule," "video alerts," and "audio alerts"—for optional selection. The screen also includes file tabs for campuses A, B, and C. Clicking on (selecting) B for example would reveal an identical list of options ("bell schedule," "video alerts," and "audio alerts") for campus B. These same options would also be available for campus C. Thus, the user is able to navigate between campuses using these screens.

It can be seen that in screen 62, "bell schedule" has been selected (appears to be flashing in FIG. 3). Once this has occurred, screen 64 pops up revealing a bell schedule which may be reset, customized for the day, or otherwise changed. This screen may be adapted to include other options not shown. Using this screen, the user could simply change a time on the screen. For example, in the case of an early dismissal day due to inclement weather, the teacher could change the dismissal time to 1 PM instead of 3 PM, as is depicted.

Referring back to FIGS. 1 and 2, it will now be discussed how this will occur. First, the user will make the appropriate change on the J2ME GUI screen 64 as discussed above. This bell-schedule change will occur as follows. Once the user changes the dismissal time from 3 PM to 1 PM in screen 64 in the wireless device 10, an update is sent to the application running on webserver 34. This results in database 30 being updated. Later, once the actual dismissal time occurs (1 PM), the application running on server 34 sends commands to the microcontroller 40 in PA system 20. These commands tell the high-power switch 48 to open up the proper audio zones (each a particular switch related to a different area in the school, e.g., classrooms) so that a WAV file may be played from database 30 using soundcard 36. The soundcard 36 output is received by external amplifier 44 and played to the appropriate zone, or zones because the switch 48 has been prepared (via the commands from server 34) to play to the proper zone (or zones).

Besides the bell schedule, the wireless device may also be used to transmit video alerts by selecting the so identified menu item on screen 62. This will result in a screen 66 shown in FIG. 3. Screen 66 is shown having three possible options—"fire," "tornado,", or "evacuate." These selections will enable the user to play prerecorded emergency videos to selected zones (typically all) in the school. The video would likely give audio and visual safety instructions to occupants of the school in the case of any of the three situations (fire, tornado, or evacuation).

Behind the scenes, the videos are likely to be JPEG or like digital video files maintained on database 30. By navigating to the proper file (e.g., tornado) the administrator could cause the JPEG to be streamed over the internet (or LANA) using a video digital decoder (not shown) and played. Like with the bell-schedule scenario described above, selectins made on the wireless device 10 would cause database 30 to be updated. Then at the appropriate time (e.g., immediately) the application on webserver 34 sends commands over the network to microcontroller 40. These commands received cause microcontroller 40 to prepare high-power switch 48 in such a way that the appropriate video content is displayed on the proper television sets in the facility.

Selection of the "audio alerts" field in screen 62 will result in the J2ME GUI on wireless device 10 displaying a screen 68 as shown in FIG. 3. This screen includes three options—"bell," "voice recording," or "siren." Like the video alerts of screen 66, the audio alerts of screen 68 are manually activated upon special occurrences. Unlike the bell schedule option which is geared towards scheduled audio (bells), the "bell," "voice recording," or "siren" would be manually activated upon an occurrence (e.g., playing a voice recording announcing the approach of potentially dangerous weather).

In these cases, the selection of the particular option (e.g., siren) will result in the web application running on server 34 playing a digital audio file through sound card 36 just like the bell-schedule example above, except that it would occur instantly rather than according to some prearranged schedule.

Rather than displaying the AV controls on device 10, the J2ME GUI and application running on server 34 could easily be reconfigured to enable the control of the schools facility systems, e.g., HVAC, lights, locks. This would be done by using the microcontroller 40 to accept commands from the user of wireless device 10 using a the web application on server 34 to perform I/O control device 50 to, e.g., turn on/off lights, change the building temperature, and unlock a door. These functions could all be accomplished immediately (like the video and audio alerts) or according to a schedule (like the bell schedule). This would be accomplished by simply changing the menus to reflect the appropriate options and by changing the application so that it transmits the appropriate commands to microcontroller 40 that will cause it to appropriately control the switches in I/O facility systems controller 50.

This could be done by adding a "hardware" option to screen 62. When selected, there would be subsequent menus which provide the options of different hardware systems within the facility, e.g., lights 28, which are able to be controlled by the wireless device 10. Other than lights, other options might be used for different circumstances. For example, to give the user the ability to control the facility's HVAC system, lights, bells, doors, or open lockers via wireless device 10. Each of these different options might be used in a variety of circumstances. For example, the administrator might receive information that the temperature in a particular classroom in a building has become uncomfortable. The administrator could then remotely change temperature settings using the facility's HVAC system using the handheld device. To do this, subsequent menus would be provided which are customized to allow adequate controlling of the schools lighting and HVAC. The greatly simplified screens shown in FIG. 3 have been shown to make this application less duplicitous.

Other hardware options which might be added regard doors and lockers. These school hardware systems can be controlled remotely as well. The door lock feature might be particularly valuable. For example, at some schools the custodian is responsible for unlocking the school in the morning before classes resume. In the case that the responsible custodian was sick, or otherwise unable to come in to work that day, the present invention could easily overcome the dilemma. Were the administrator to alerted to these circumstances, he or she could unlock the doors remotely using wireless device 10, negating the need to make a special trip to the school just to unlock it.

With respect to the "lockers" feature, sometimes, because of privacy interests of the students, only certain administrators will have access to the automatic lock systems which control the lockers of the students. In the circumstance a teacher observes a student putting some form of contraband into his or her locker (e.g., a weapon) it may be important that the locker be opened immediately. Rather than waiting for the administrator to show up to the facility, as would be required by the prior art systems, the administrator can simply unlock the locker remotely using the handheld device 10.

Consideration of the embodiment disclosed in FIGS. 1-3 causes one to realize that the systems described would enable a user of the handheld device to accomplish numerous objectives by interfacing with the system equipment to numerous to specify herein.

As can be seen, the present invention and its equivalents are well-adapted to provide a new and useful method of interfacing with the systems of a facility using a wireless handheld device. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out order described.

The invention claimed is:

1. One or more computer storage media, having computer-usable instructions embodied thereon for performing a method of wirelessly interfacing with a facility system of a school, said facility system including a server and a database, said method comprising:

presenting school-communication options to a user on a wireless device including a log in screen for receiving a username and password, and a menu screen including a bell schedule, video alerts, and audio alerts, the menu screen further including a plurality of indicia, each of the indicia being selectable by the user and corresponding to one of a plurality of school campuses controllable by the wireless device;

receiving a first selection of one of the indicia corresponding to one of the plurality of school campuses controllable by the wireless device, the first selection enabling said user to make a second selection from the menu screen to select a school-communication option for updating one or more of the bell schedule, video alerts, and audio alerts for the one of the plurality of school campuses corresponding to the selected indicia;

receiving a third selection by said user, said third selection enabling-the user to enter updated information for the selected school-communication option wirelessly transmitting said updated information to said server in said facility system for the purpose of updating said database in said facility system using said updated information.

2. The media of claim 1, wherein said video alerts and audio alerts are selected from said menu screen to play a pre-recorded emergency video message and audio message respectively.

3. The media of claim 1, said presenting-school-communication-options step comprising:

enabling said user to alter-said bell schedule; and including said bell schedule change in said updated information.

4. The media of claim 1, said method comprising:

requiring said username and password before allowing access to said server in said facility system, wherein said wireless device is a java-enabled phone that utilizes a java application to control said plurality of school campuses and respective school facility systems utilizing a CDMA network.

5. One or more computer storage media, having computer-usable instructions embodied thereon for performing a method of wirelessly managing a facility system of a school, said method comprising:

receiving a signal from a wireless device over a wireless network, wherein said signal includes updated information entered in the wireless device by a user accessing a log m screen to enter a username and password, being presented with a menu screen including a plurality of indicia, each of the indicia selectable by the user and corresponding to one of a plurality of school campuses controllable by said wireless device, making a first selection of one of the indicia corresponding to one of a plurality of school campuses controllable by the wireless device, making a second selection from the menu screen for selecting a school-communication option for updating one or more of a bell schedule, video alerts, and audio alerts for the one of the plurality of school campuses corresponding to the selected indicia, making a third selection enabling the user to enter the updated information for the selected school-communication option;

receiving a selection of one of said plurality of school campuses for controlling a plurality of facilities through said wireless device;

updating a process running on a server connected to said wireless network in response to said signal; and dispatching a command to a network device based on said signal for the purpose of causing one of a facility communications device and a facility hardware device of the one of the plurality of school campuses to play one of video and audio in response to said command.

6. The media of claim 5 wherein said wireless network is a CDMA network, and wherein said wireless device is a java-enabled phone.

7. The media of claim 6 wherein said method comprises:

receiving signals regarding the plurality of facilities; and transmitting commands to said plurality for the purpose of enabling the control of the plurality of facilities using one wireless device.

8. The media of claim 7 wherein said method comprises:

receiving said signals regarding said plurality of facilities over the internet.

9. A system for remotely controlling a school campus system comprising:

a first network device including:

a first webserver and a database on a network associated with said school campus;

a network interface component configured to receive control signals; and a processing component configured to generate a first command based on said control signals;

wireless device that includes:

a memory component that stores executable instructions for controlling a plurality of school campuses and a plurality of facilities within each of the plurality of school campuses;

a second processor component that executes the executable instructions in the memory component to generate a menu screen that includes a bell schedule, video alerts, and audio alerts;

a display component for displaying the menu screen to a user; and a second network interface configured to transmit said control signal to the first network device based on a user selection of said menu screen;

a second network device on said network associated with said first campus, said second network device including:

a first microcontroller which is adapted to receive the first command from an application running on said first webserver through a local area network and cause a first switch device to control a facility public-address system receiving audio signals generated by a tone generator for output to a plurality of audio zones, and a facility systems controller to control power systems in response to said first command.

10. The system of claim 9 comprising:

a third network device in a second campus, said third network device including a second webserver and a second database on a second campus network;

a fourth network device on said second campus network, said fourth network device including a second microcontroller which is adapted to receive a second command from said application running on said second webserver and cause a second switch device to control a facility public-address system in said second campus in response to said second command.

11. The system of claim 9 wherein said public address system in said first campus includes said plurality of audio zones:
   each audio zone being in connection with one of a plurality of switches on said first switch device,
   wherein said second network device may be controlled by said first microcontroller and a user interface configured to receive user input.

12. The system of claim 9 comprising:
   a facility systems controller in said first campus which receives said command and changes the condition of one of a plurality of facility hardware components in response to said command.

13. The system of claim 12 wherein said facility systems controller is an I/O control device, wherein said I/O control device is controllable by said wireless device and manually by a user through a user interface.

14. The system of claim 13 wherein said hardware component is any of a light, a lock, a locker control, and an HVAC component.

15. The system of claim 13 wherein said wireless device is a java-enabled cell phone configure to communicate with said network through a CDMA network.

16. The system of claim 13 wherein said first network device further includes a sound card connected to an amplifier in said second network device configured to play audio content to said plurality of audio zones, and wherein said first network device communicates with said second network device through said network utilizing an Ethernet connection.

17. The system of claim 9 comprising:
   at least one audio zone in said public-address system in said first campus, said audio zone being in connection with one of a plurality of switches on said first switch device; and
   said one of said plurality of switches on said first switch device is adapted to enable the broadcast of a video alert in said at least one audio zone in response to said first command.

18. The system of claim 9 comprising:
   at least one audio zone in said public-address system in said first campus, said audio zone being in connection with one of a plurality of switches on said first switch device; and
   said one of said plurality of switches on said first switch device is adapted to enable the broadcast of an audio alert in said at least one audio zone in response to said first command.

19. The media of claim 1, further comprising:
   navigating between the plurality of school campuses utilizing the menu screen, wherein the user may configure options for the bell schedule, video alerts, and audio alerts for each of the plurality of school campuses through options displayed on the menu screen, and wherein the audio alerts include options for configuring a bell, voice recording, and siren;
   presenting option on the menu screen for controlling an electrical system, lights, an HVAC system, a surveillance system, locks, a locker control, media playback devices, a voicemail system; and
   allowing the user to navigate between the plurality of school campuses for controlling facilities of each of the plurality of school campuses.

20. The system of claim 9, wherein the user interface includes media controls for selectively playing audio content and video content including emergency instructions to one or more of said plurality of audio zones, and wherein said user interface further includes a hot mic configured to selectively make announcements for the one or more of said plurality of audio zones.

21. The media of claim 1, wherein the indicia comprises one or more file tabs.

22. The media of claim 1, wherein the menu screen further includes a hardware option enabling the user to control one or more hardware systems of the one of the plurality of school campuses corresponding to the selected indicia.

23. The media of claim 22, wherein the one or more hardware systems includes a door lock system for controlling a locking mechanism of a door.

24. The media of claim 23, wherein the door comprises a locker door.

* * * * *